Aug 5, 1941.                E. G. TOUCEDA                2,251,473
                              CAMERA
                         Filed Feb. 3, 1938

INVENTOR
Enrique G. Touceda
By
ATTORNEY

Patented Aug. 5, 1941

2,251,473

UNITED STATES PATENT OFFICE 2,251,473

CAMERA

Enrique G. Touceda, Loudonville, N. Y., assignor to American Industrial Research, Inc., Albany, N. Y., a corporation of New York Application February 3, 1938, Serial No. 188,479

5 Claims. (Cl. 95—64)

My invention relates to cameras having the usual lens and shutter but in which a diaphragm and associated means are provided whereby the amount of light admitted to the plate or light sensitive film in said camera is automatically controlled.

In photography, various types of plates or films may be employed which have characteristics particularly adapting them for use under certain conditions. For example, due to the emulsion thereon, some films may be properly exposed in a much shorter time interval than other films which are exposed under the same or equivalent lighting conditions. To the trade, these films are known as "high speed" films which term is intended to designate the fact that for given lighting conditions a theoretically correct exposure of the film which is dependent on both time and light intensity may be made with a fairly short exposure as compared to ordinary films. One advantage, of course, of using such high speed films lies in the fact that, with ordinarily poor lighting conditions, correctly exposed pictures of moving objects, for example, may be taken with necessarily short exposures to provide prints which are not blurred but are clear and sharp. In attempting to take the same picture under like conditions with the same diaphragm setting but with the slower type of film, a properly timed exposure, that is, one of a duration sufficiently short to provide a "still" or unblurred image of the moving object, would not admit sufficient light thereby producing an underexposed film and poor photograph. On the other hand, if the exposure were prolonged to admit more light, the image would be blurred due to the fact that the exposure period was greater than that permissible.

It follows, therefore, that in order correctly to expose films or plates, cognizance must be taken both of the character of the light-sensitive surface of the film or plate employed and the prevailing light intensity. Adjustment, therefore, of the camera diaphragm should be made to admit the proper amount of light during film exposures which amount depends upon the light sensitivity of the film and the intensity of light under which exposures are made.

My invention, therefore, has for an object the provision of a camera comprising the usual lens, shutter and diaphragm and means for automatically controlling the setting or opening of said diaphragm according to the type of film employed and lighting conditions existing at the time exposures of the film are made. Another object resides in the provision of a camera of the foregoing character comprising an electrically operated diaphragm, an electric circuit and light-sensitive means arranged to control the operation of said circuit whereby said diaphragm is continuously adjusted to suit changing light conditions. More specifically, another object resides in providing, in a camera of the above character, an electrically operated diaphragm which is controlled by a light-sensitive cell which, in turn, is so arranged that initially the amount of light admitted thereto may be so manually adjusted that automatic setting of said diaphragm is dependent both upon prevalent lighting conditions and the type of film employed.

A still further object of my invention lies in the provision of a diaphragm which is particularly designed and arranged for automatic operation.

With these and other objects in view, my invention includes the novel elements and the combinations and arrangements thereof described below and illustrated in the accompanying drawing, in which—

Figure 1:
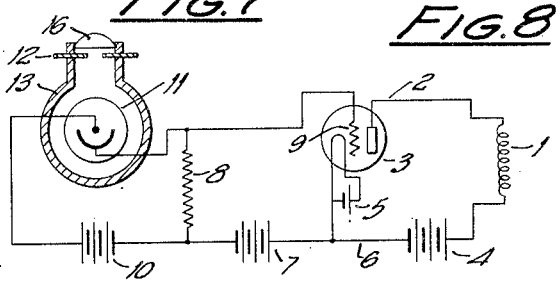
Fig. 1 is a wiring diagram illustrating a preferred arrangement of my invention.

Referring first to Fig. 1, I indicates generally a coil, hereinafter more particularly referred to, for adjusting the diaphragm associated with the usual lens and shutter of my camera. The coil I is connected in the plate circuit 2 of a tube 3 and between the plate thereof and a plate battery 4. The usual filament of the tube 3 is connected across a battery 5 and one side thereof is connected to conductor 6 which is connected between plate battery 4 and a grid battery 7. Battery 7 is connected through resistor 8 to the grid 9 of the tube 3 and resistor 8 is also connected between a battery 10 and the cathode of a light-sensitive cell 11, the anode of cell 11 being connected to the other side of battery 10.

In the operation of this circuit, tube 3 serves to control the amount of electrical energy supplied to the coil I and the light-sensitive cell 11 serves, in turn, to supervise or control the operation of tube 3 whereby variations in the intensity of the light to which the cell 11 is subjected will produce variations in the energy or current supplied to coil I. In other words, under given lighting conditions coil 1 will be energized to a certain degree by the current flowing in the plate circuit of the tube 3. In the embodiment of my invention herein illustrated, however, and assuming that the intensity of light falling on cell 11 increases, a greater electron emission will occur from the light-sensitive surface of the cathode to the anode thereof thereby decreasing or making more positive the grid potential of tube 3 to increase the current in the plate circuit 2. Obviously, upon a decrease in light intensity, the reverse occurs and the energization of coil 1 is accordingly reduced. Assuming, therefore, as will hereinafter appear, that coil 1 is so arranged with an associated diaphragm as to increase and decrease the size of the openings therein in accordance respectively with decreased and increased field strength of said coil, it is evident that the light-sensitive cell 11 serves automatically to regulate the diaphragm setting in accordance with prevalent lighting conditions. The foregoing circuit, of course, could be modified to produce variations in field strength of coil 1 which are inversely proportional to changes in light intensity if the coil and associated diaphragm were so arranged as to require an operation of the circuit in this manner.

Figure 2:
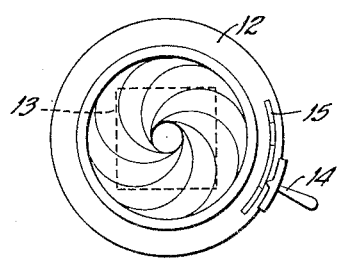
Fig. 2 is an elevation view of a manually operable diaphragm.

It is, however, desirable further to control the operation of coil 1 so that the automatic setting of the diaphragm associated therewith is also dependent upon the nature or light sensitivity of the film employed. That is to say, diaphragm setting should also be made to meet the requirements of film characteristics of "high" or "low" speeds. I have, therefore, provided a manually adjustable diaphragm indicated generally at 12 in Fig. 2 which diaphragm is associated with and serves initially to control the amount of light admitted to the light sensitive cell 11, herein illustrated as enclosed in a suitable receptacle which is indicated in dotted lines at 13 in Fig. 2 and somewhat schematically represented in full lines in Fig. 1. Diaphragm 12 may be of the usual iris construction and is provided with an adjusting handle 14 for adjusting the size of the aperture thereof. A scale 15, preferably calibrated in terms of the light characteristics of films such as film speeds, is affixed to the diaphragm casing for use in making proper diaphragm settings. As indicated in Fig. 1, a lens 16 may be associated with the diaphragm 12 and, furthermore, the combination of lens, diaphragm, cell and casing may be suitably embodied in the camera structure.

In use, the diaphragm 12 is adjusted to provide an aperture of a size deemed correct for the particular type or nature of film employed. Films are supplied to the trade bearing an indication of the correct diaphragm setting which should be used under a stated lighting condition, and diaphragm 12 may therefore be set according to corresponding indications provided with the respective types of films. Hence, coil 1 and its associated circuit are so arranged that a correct adjustment of diaphragm 12 will effect a correspondingly correct adjustment of the camera diaphragm associated with the coil 1 and, also, any departure in the prevailing lighting conditions from that assumed and for which diaphragm 12 has been set will automatically effect a further adjustment of the diaphragm controlled by coil 1. It should be evident, therefore, that I have provided a circuit including means for automatically adjusting the diaphragm of a camera to admit substantially that amount of light which is deemed most favorable for proper exposures as dictated both by the type of film employed and prevalent lighting conditions under which each exposure is made.

Figures 3, 4:
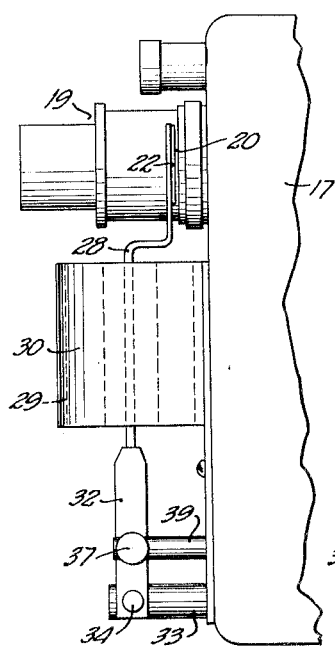
Fig. 3 is a fragmentary side elevation of a camera casing illustrating my preferred form of diaphragm associated therewith.
Fig. 4 is a front elevation view thereof.
Figure 5:
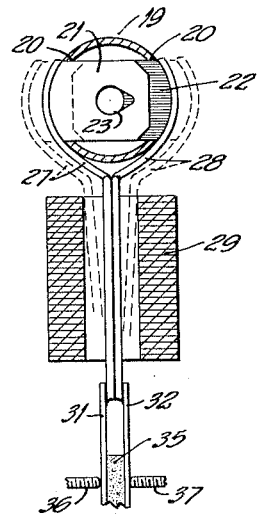
Fig. 5 is a sectional detail view of the automatically adjustable diaphragm.
Figure 9:
Fig. 9 is a view taken at right angles to either Fig. 7 or 8, as in the plane 9—9 of Fig. 8.
Figure 6:
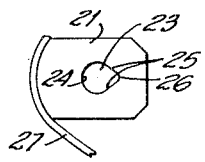
Fig. 6 is an elevation view of one of the cooperable elements forming the diaphragm.

In Figs. 3 to 8 inclusive, I have illustrated a preferred form of electrically controlled diaphragm and one way in which it may be associated with a camera. 17 indicates a camera casing which is provided with the usual object lens 18 mounted within a lens housing 19. One portion of the housing 19 is provided with a slot 20 which is adapted slidably to receive the elements 21 and 22, as shown in Fig. 5, which elements serve cooperatively to form an adjustable camera diaphragm. Each of the elements 21 and 22 is preferably formed of comparatively thin, flat, opaque material, each having an opening 23 therein of varying extent, as shown in Fig. 6. A portion of the sides or walls of these openings, as at 24, is preferably circular and extends somewhat in excess of 180° and the adjacent wall portions thence converge as indicated at 25 to the point 26 where the walls may be slightly rounded. The elements 21 and 22 may be substantial duplicates and, in cooperative relation, they are arranged to lie in superimposed, adjacent positions within the slot 20 with the converging portions of the openings 23 thereof disposed in opposed relation. Hence, these elements may be moved relatively and in opposite directions so that the opening 23 in each may be brought to varying degrees of registry with the other.

The elements 21 and 22 are respectively mounted in any suitable manner on supporting arms 27 and 28 which extend downwardly and pass within the cylindrical bore of a coil 29 forming the field winding of an electromagnet. Coil 29 is supported by a bracket 30 which in turn is supported on the face of the camera casing and, in the embodiment illustrated, substantially in vertical alignment with the center of the camera lens. The lower ends of arms 27 and 28 may be secured to or formed integrally with resilient elements 31 and 32 which are mounted in spaced relation on a supporting stud 33 as by means of a rivet 34. Between the elements 31 and 32 is preferably disposed a member 35 of somewhat resilient or compressible character which may be formed of felt, rubber or similar material. Adjusting screws 36 and 37, which are threaded through supporting posts 38 and 39 serve to permit adjustment of the compression between the arms 27 and 28 and also joint movement of said arms whereby properly to position the diaphragm aperture relative to the lens of the camera. For example, the elements 21 and 22 should be so positioned that when relatively moved the diaphragm aperture so formed thereby for all positions of said elements will pass light from the camera lens therethrough or, in other words, the elements forming the diaphragm should be so positioned that the line of collimation of the camera lens will pass through the aperture of the diaphragm at all times.

Figure 7:
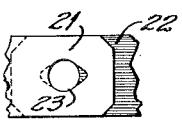
Figs. 7 and 8 are fragmentary elevation views illustrating the cooperable elements of my diaphragm in relatively adjusted positions to provide diaphragm openings of different sizes.
Figure 8:
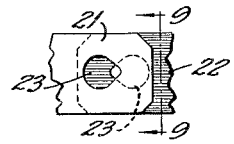

In operation, the coil 29 which is the equivalent of coil 1 of Fig. 1 is connected in the plate circuit of tube 3. When the coil is unenergized, arms 27 and 28 may abut each other thereby positioning the elements 21 and 22 to provide full diaphragm opening substantially as shown in Fig. 5. However, when coil 29 is energized and depending upon the degree of energization thereof, the arms 27 and 28, which are at least in part formed of magnetic material, are moved outwardly and apart as, for example, to the dotted line positions illustrated in Fig. 5. The degree to which the arms 27 and 28 are separated is dependent, of course, upon the field strength of coil 29 and determines the size order of the aperture formed by the diaphragm. Fig. 8 for example illustrates the elements 21 and 22 relatively moved to positions affording a comparatively small diaphragm opening whereas Fig. 7 illustrates the position of the elements providing substantially full diaphragm opening.

In the arrangement illustrated, elements 21 and 22 are adapted to be simultaneously moved substantially to the same degree but in opposite directions when influenced by coil 29 so that the approximate centers of diaphragm apertures for all magnitudes are coincident.

In using my camera, it is merely necessary to note, for example, the diaphragm-setting indication provided with the film to be employed and the indication so noted should, of course, be for that lighting condition which has been assumed in the design and arrangement of the diaphragm 12 and associated light-sensitive cell and circuit. For example, the diaphragm setting for normal light may be employed and, accordingly, the user having knowledge of this, will, in every instance, set the diaphragm 12 to the diaphragm setting supplied with the film for normal light. Variations in light intensity from that assumed will, of course, further affect the light-sensitive cell and, therefore, automatic adjustment of the camera diaphragm will be effected both to meet the requirements of the type of film employed and prevalent lighting conditions.

My invention is particularly adapted for use in cameras designed automatically to make film exposures at predetermined time intervals. In the use of cameras of this character, considerable variations in light intensity may occur during the interval of operation thereof which may be of considerable duration and, of course, under such conditions and without proper or periodic adjustment of the camera diaphragm, poor photographic prints will result. By employing a camera embodying an automatically regulated diaphragm of the character herein described, the camera diaphragm will be automatically and substantially correctly adjusted according to variations in lighting conditions whereby the films may be properly exposed under substantially all lighting conditions without any necessity of exercising personal supervision over the camera.

In the foregoing description and appended claims, the term "diaphragm" is intended to include all devices which function to control the passage of light and which when employed with a light-sensitive cell, for example, control the amount of light falling thereupon.

While I have described my invention in its preferred embodiment it is to be understood that the words which I have used are words of description rather than of limitation and that changes within the purview of the appended claims may be made without departing from the true scope and spirit of my invention in its broader aspects.

What I claim is:

1. A diaphragm of the character described comprising two, comparatively thin, elements movably mounted in adajacent, superimposed position, each of said elements being provided with an aperture, an electromagnetic coil and a pair of arms extending side by side and axially of said coil and comprising a magnetic material, said arms respectively bearing one of said thin elements at the upper ends thereof, whereby an energization of said coil will produce relative movement between said thin elements.

2. A diaphragm of the character described comprising two, comparatively thin, elements movably mounted in adjacent, superimposed position, each of said elements being provided with an aperture, an electromagnetic coil and a pair of resilient arms extending side by side and axially of said coil and comprising a magnetic material, said arms respectively bearing one of said thin elements at the upper ends thereof, whereby an energization of said coil will produce relative movement between said thin elements.

3. A diaphragm of the character described comprising two, comparatively thin, elements movably mounted in adjacent, superimposed position, each of said elements being provided with an aperture, an electromagnetic coil and a pair of arms comprising a magnetic material, a common means for supporting said arms to extend substantially axially of said coil, said arms respectively bearing one of said thin, diaphragm elements and said arms being adapted to move laterally of said coil whereby an energization of said coil will produce relative movement between said thin elements.

4. In a device of the character described, the combination with a camera including a lens of a diaphragm comprising two, comparatively thin, elements movably mounted in adjacent, superimposed position, each of said elements being provided with an aperture arranged to register with each other to varying degrees, a pair of arms substantially fixed against relative movement in a zone thereof but otherwise relatively movable and the relatively movable portions thereof respectively bearing one of said diaphragm elements, electrical means for relatively moving the movable portions of said arms and means coacting with the relatively fixed zones of said arms for simultaneously moving said arms in the same direction whereby the opening cooperatively provided by said diaphragm elements may be correctly positioned relative to said lens.

5. In a device of the character described, the combination with a camera including a lens of a diaphragm comprising two, comparatively thin, elements movably mounted in adjacent, superimposed position, each of said elements being provided with an aperture arranged to register with each other to varying degrees, electrical means for effecting relative movement of said diaphragm elements whereby to vary the size of the opening cooperatively provided thereby and resilient means arranged to oppose a relative movement of said diaphragm elements by said electrical means, and means for simultaneously moving said diaphragm elements in the same direction and for bodily moving said resilient means therewith whereby correctly to position the opening, cooperatively provided thereby, relative to said lens while the resistance offered by said resilient means to movement of said diaphragm elements by said electrical means is substantially unaffected.

ENRIQUE G. TOUCEDA.